Patented Mar. 12, 1929.

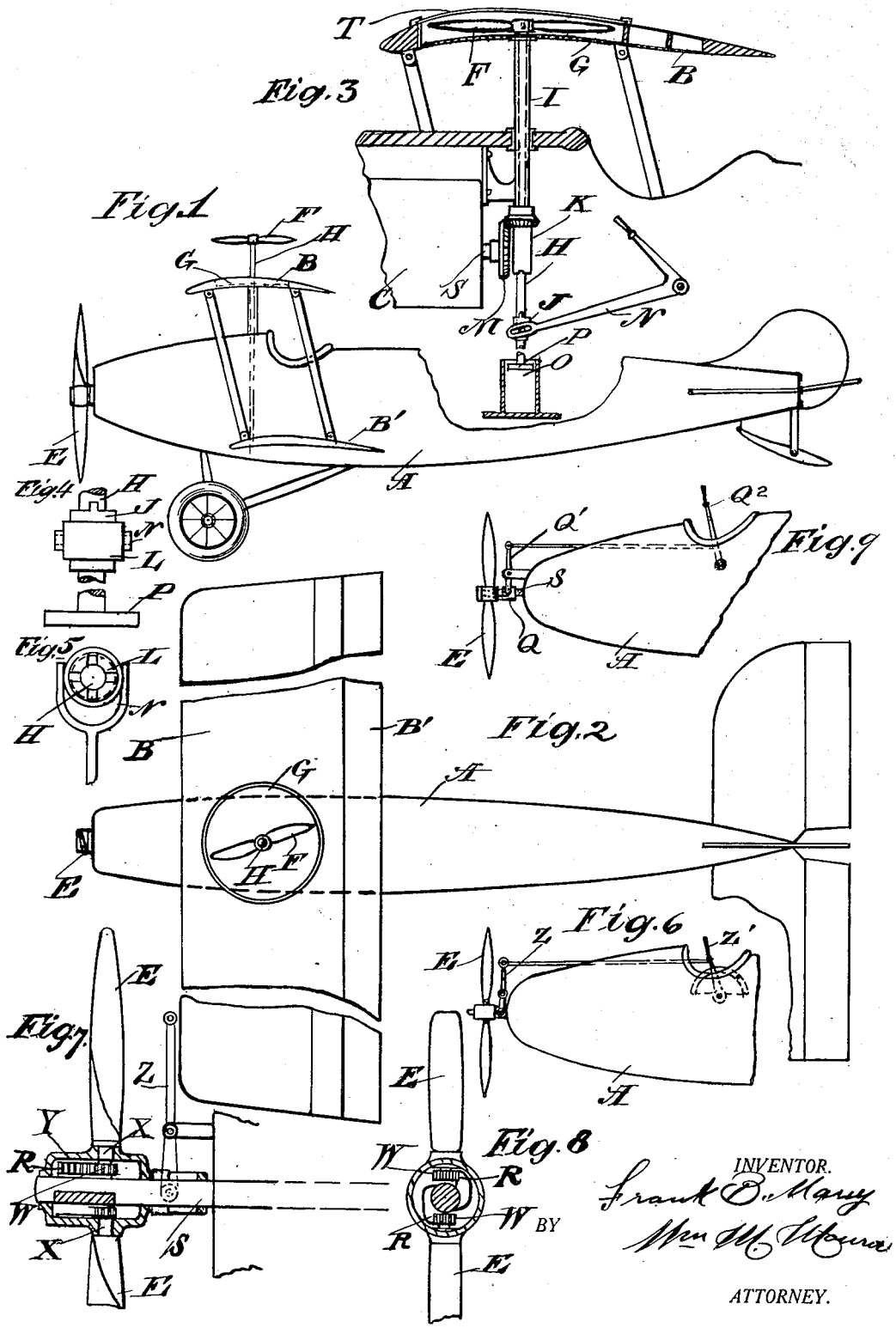

1,704,753

UNITED STATES PATENT OFFICE.

FRANK B. MANY, OF CLEVELAND, OHIO.

HELICOPTER AEROPLANE.

Application filed June 15, 1925. Serial No. 37,241.

The subjects of the invention are to provide an aeroplane with disappearing helicopter blades in which the axis of rotation is vertical, and by means of which the air ship may be lifted vertically from the ground, if the air ship is of the ordinary type, or from the water, when the ship is of the hydroplane type, thus permitting it to rise from a restricted space such as the deck of a vessel or from the top of a high building, or when enclosed by trees, without danger of striking against any surrounding objects, which might occur if its path were inclined in the ordinary manner.

This construction also permits the ship to make a convenient landing where a long glide would be impossible for the same reason.

The improved device is attachable to all mono, or biplanes, having blades revolving upon horizontal axes in the ordinary manner, and the helicopter blades when not in use are preferably enclosed in the wings or planes of the ship, thus concealing them from view and preventing them from interfering with the stream line surfaces of the wings, or from adding frictional resistance to their passage through the air.

The device includes, revolving helicopter blades mounted upon a vertical shaft, which is telescopically movable within a fixed sleeve, and can be concealed from view when not in use in a suitable recess within the upper wing or cabin of the ship, and can be raised at will, and operated independently of the main propeller blades, also the same engine may be employed to operate both blades, and to operate the main propeller blade alone after a suitable elevation above the ground has been attained by the use of the helicopter blades.

The device is illustrated in the accompanying drawings, hereinafter more fully described, and specifically pointed out in the claims.

In the accompanying drawings Fig. 1, is a side elevation showing a bi-plane provided with a lifting propeller, Fig. 2, is a plan thereof; Fig. 3, is an enlarged vertical section of one plane thereof, showing the telescoping shaft of the lifting propeller and its enclosing sleeve; Fig. 4 is a detail of the clutch on the shaft and Fig. 5 is a section thereof; Fig. 6 is an elevation showing the main propeller blades revolvable on radial axes; Fig. 7 is an enlarged longitudinal section thereof and Fig. 8 is a transverse section thereof; Fig. 9 is a side elevation showing clutch mechanism for connecting and disconnecting the main propeller with the engine shaft.

A represents the body of the fuselage, B the wings or planes. C is the engine, S is the engine shaft, E is the main propeller mounted upon the engine shaft. F is the lifting propeller preferably sunk within a recess G in the upper surface of the upper plane. H is the operating sleeve therefor, I is a vertical shaft, with which the operating sleeve, H revolves, J is a clutch sleeve rigidly secured to the lower end of this shaft.

This shaft is raisable to engage the clutch J with a clutch pinion K on the sleeve H, which is in engagement with the bevel gear M upon the engine shaft.

N is a lever by means of which the shaft I is raised by means of the sleeve L until the clutch J engages with the pinion K after which the action of the propeller F will retain the parts in engagement until the lever is again operated to separate them from each other. A dash pot O and piston P act as shock absorbers where the shaft I falls.

The pinion K is preferably constructed with a number of teeth less than the gear A so that while the engine is operating both of the propellers, the raising propeller will be operating at a much greater rate of speed than the propeller E that propels the ship in a horizontal direction, the result being that the ship will rise to the necessary height to clear all obstacles, and high enough to be permitted to glide, while the engine is running at low speed and before the other propeller will move fast enough to propel the ship in a horizontal direction. This action will enable the operator to surmount all obstacles before the ship is permitted to move forward.

The particular mechanism illustrated may be modified if desired without departing from the spirit of the invention. For instance, the recess in which the lifting propeller blade is depressed may have a removable cover, T, to prevent air friction thereon when the ship is moving forward, and other geared connections may be employed within the scope of the claims.

In Figures 6, 7 and 8 the main propeller blades are shown revolvable on radial axes X, X, to a neutral position, when the lifting plane is in use, thus avoiding the possibility of any forward movement of the air ship while the lifting plane is being operated.

This is accomplished by means of racks R upon the main shaft S, and pinions W upon the shafts X of the propeller blades.

The axial shafts X, X, are pivoted upon the housing Y, which is moved forward and backward by means of a rock arm Z and lever Z'. The amount of movement is limited by positioning the lever upon an arc in a predetermined point. If desired the main propeller may be completely reversed so as to serve as a buffer to reduce the speed of the ship. In Fig. 9 the main propeller may be wholly disconnected from the engine shaft S while the other propeller is in use by means of the clutch Q, arm Q' and lever $Q^2$.

Having described the invention, what I claim as new and desire to secure by Letters Patent is:

1. In an aeroplane, the combination with the body, engine and horizontal engine shaft, and main propeller thereon, and a supporting plane, of a vertical shaft and propeller thereon, a sleeve revolvable with said vertical shaft, said shaft being revolvable and vertically movable therein, a gear and clutch mechanism for operatively and detachably connecting said vertical and horizontal shafts, and means for raising and lowering said vertical shaft in said sleeve, and a recess in said supporting plane in which said raising propeller is revolvably depressed.

2. In an aeroplane, the combination with the body, or fuselage, the engine and engine shaft, and main propeller thereon, and a supporting plane, of a rotatable sleeve and helicopter shaft therein and propeller thereon, means for raising and lowering said helicopter shaft, gearing for rotating said sleeve and shaft and propeller, a guide for said helicopter shaft, detachable means for operatively connecting said shafts, a recess in the upper surface of said supporting plane into which said helicopter propeller may be inserted, and shock absorbing means at the base of said shaft.

In testimony whereof, I hereunto set my hand this 25th day of April, 1925.

FRANK B. MANY.